(12) United States Patent
Liu et al.

(10) Patent No.: US 10,203,819 B2
(45) Date of Patent: Feb. 12, 2019

(54) TOUCH SCREEN, FABRICATION METHOD THEREOF AND DISPLAY DEVICE

(71) Applicants: BOE Technology Group Co., Ltd., Beijing (CN); HEFEI BOE Optoelectronics Technology Co., Ltd., Hefei (CN)

(72) Inventors: Tianzhen Liu, Beijing (CN); Gaofei Shi, Beijing (CN); Chengcheng Wang, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 104 days.

(21) Appl. No.: 14/916,621

(22) PCT Filed: Sep. 2, 2015

(86) PCT No.: PCT/CN2015/088828
§ 371 (c)(1),
(2) Date: Feb. 6, 2017

(87) PCT Pub. No.: WO2016/155234
PCT Pub. Date: Oct. 6, 2016

(65) Prior Publication Data
US 2017/0160829 A1    Jun. 8, 2017

(30) Foreign Application Priority Data
Mar. 31, 2015 (CN) .......................... 2015 1 0149363

(51) Int. Cl.
B29D 11/00 (2006.01)
G06F 3/044 (2006.01)
G06F 3/041 (2006.01)

(52) U.S. Cl.
CPC ............ *G06F 3/044* (2013.01); *G06F 3/0416* (2013.01); *G06F 2203/04103* (2013.01); *G06F 2203/04111* (2013.01)

(58) Field of Classification Search
USPC ................................ 216/24, 41, 49; 345/173
See application file for complete search history.

(56) References Cited

U.S. PATENT DOCUMENTS

2004/0099438 A1* 5/2004 Arthur .................. B82Y 10/00
174/257
2014/0240619 A1* 8/2014 Yokohama .............. G06F 3/044
349/12

(Continued)

FOREIGN PATENT DOCUMENTS

CN        101078820 A     11/2007
CN        101576793 A     11/2009

(Continued)

OTHER PUBLICATIONS

Mar. 15, 2017—(CN) First Office Action Appn 201510149363.6 with English Tran.

(Continued)

*Primary Examiner* — Binh X Tran
(74) *Attorney, Agent, or Firm* — Banner & Witcoff, Ltd.

(57) ABSTRACT

A touch screen, a fabrication method thereof and a display device are provided. The method comprises: forming a touch electrode on a light emission side of a display panel after the display panel is formed; and forming an organic transparent insulation layer on the light emission side of the display panel where the touch electrode has been formed. An absolute value of a difference between a refractive index of the organic transparent insulation layer and a refractive index of the touch electrode is less than or equal to a predetermined value.

16 Claims, 2 Drawing Sheets

(56) References Cited

U.S. PATENT DOCUMENTS

| | | | | |
|---|---|---|---|---|
| 2015/0022743 A1* | 1/2015 | Takao | ................. | G06F 3/041 |
| | | | | 349/12 |
| 2015/0090578 A1* | 4/2015 | Son | ................. | G06F 3/044 |
| | | | | 200/600 |
| 2015/0277623 A1* | 10/2015 | Nakamura | ............. | G06F 3/044 |
| | | | | 345/174 |
| 2015/0378477 A1* | 12/2015 | Yoshiki | ................. | G06F 3/044 |
| | | | | 345/174 |
| 2016/0081183 A1* | 3/2016 | Ha | ................. | H05K 1/0274 |
| | | | | 345/174 |
| 2016/0370512 A1* | 12/2016 | Yamamoto | ............. | G02F 1/13363 |
| 2018/0107112 A1* | 4/2018 | Sato | ................. | B32B 7/02 |

FOREIGN PATENT DOCUMENTS

| | | |
|---|---|---|
| CN | 101661355 A | 3/2010 |
| CN | 102455837 A | 5/2012 |
| CN | 202887127 U | 4/2013 |
| CN | 103258596 A | 8/2013 |
| CN | 203338330 U | 12/2013 |
| CN | 104699309 A | 6/2015 |
| JP | 2004021550 A | 1/2004 |
| JP | 2013039739 A | 2/2013 |
| JP | 2014074937 A | 4/2014 |
| TW | 201241510 A | 10/2012 |

OTHER PUBLICATIONS

Dec. 31, 2015—(WO)—International Search Report Appn PCT/CN2015/088828 with English Tran.

* cited by examiner

TOUCH SCREEN, FABRICATION METHOD THEREOF AND DISPLAY DEVICE

The application is a U.S. National Phase Entry of International Application No. PCT/CN2015/088828 filed on Sep. 2, 2015, designating the United States of America and claiming priority to Chinese Patent Application No. 201510149363.6 filed on Mar. 31, 2015. The present application claims priority to and the benefit of the above-identified applications and the above-identified applications are incorporated by reference herein in their entirety.

TECHNICAL FIELD

Embodiments of the present disclosure relate to a touch screen, a fabrication method thereof and a display device.

BACKGROUND

For example, touch screens are classified into three types: add-on type touch screen, on-cell type touch screen, and in-cell type touch screen. In the on-cell type touch screen, a touch electrode is provided between an opposed substrate of a display panel and a polarizer provided on a side of the opposed substrate. The on-cell type touch screen has high yield and will not reduce an area of a display region of the display panel.

In a current on-cell type touch screen, transparent conductive oxide materials (such as, Indium Tin Oxide (ITO)) are used to fabricate the touch electrode on a glass substrate which is provided on a light emission side of the touch screen. Since a difference between a refractive index of the ITO and a refractive index of the glass substrate is relatively large, in a state where the touch screen is not turned on, there are relatively large optical path difference and phase difference between reflected light of external natural light in a region having the touch electrode and reflected light of external natural light in a region not having the touch electrode, resulting in a problem of poor shadow elimination in the touch screen. In addition, since a difference between a transmittance of the ITO and a transmittance of the glass substrate is relatively large, in a state where the touch screen is turned on, the transmittance of light inside the touch screen in a region having the touch electrode and the transmittance of light inside the touch screen in a region not having the touch electrode are different, resulting in white stripes in the touch screen.

In order to solve the above problems, a shadow elimination glass is used as the glass substrate which is provided on the light emission side of the touch screen; or, a transparent inorganic insulation thin film having a refractive index similar to that of the ITO is deposited on the touch electrode. The shadow elimination glass has high cost; in the case that the shadow elimination glass is used as the glass substrate of the touch screen, the fabrication cost of the touch screen is increased. In addition, the inorganic insulation thin film is deposited at relatively high temperature (for example, above 200° C.); in the case that the inorganic insulation thin film is deposited on the touch electrode, damages to the touch screen easily occur.

SUMMARY

According to an embodiment of the present disclosure, there is provided a fabrication method of a touch screen. The method comprises: forming a touch electrode on a light emission side of a display panel after the display panel is formed; and forming an organic transparent insulation layer on the light emission side of the display panel where the touch electrode has been formed by using a coating process. An absolute value of a difference between a refractive index of the organic transparent insulation layer and a refractive index of the touch electrode is less than or equal to a predetermined value.

For example, the predetermined value is 0.2.

For example, after forming the organic transparent insulation layer, the method further comprises: patterning the organic transparent insulation layer, to form a pattern of the organic transparent insulation layer complementary to the touch electrode.

For example, the forming the organic transparent insulation layer includes: coating an organic transparent insulation material having a photosensitivity to form the organic transparent insulation layer; wherein the photosensitivity of the organic transparent insulation material is contrary to a photosensitivity of a photoresist which is used in forming the touch electrode; and the patterning the organic transparent insulation layer includes: exposing the organic transparent insulation layer with a same mask which is used in forming the touch electrode; and developing the exposed organic transparent insulation layer.

For example, the coating the organic transparent insulation material includes: coating any one of a phenol aldehyde resin material, an acrylic material and a polyamide material.

For example, the forming the pattern of the organic transparent insulation layer includes: forming the pattern of the organic transparent insulation layer having a thickness same as that of the touch electrode.

For example, the touch electrode and the pattern of the organic transparent insulation layer have a thickness in a range of 50 nm to 200 nm.

For example, the forming the touch electrode includes: forming a plurality of touch driving electrodes and a plurality of touch sensing electrodes insulated from each other and arranged in a same layer. The touch driving electrodes and the touch sensing electrodes are parallel to each other and alternately arranged.

According to an embodiment of the present disclosure, there is provided a touch screen. The touch screen comprises: a formed display panel; a touch electrode, formed on a light emission side of the display panel; and an organic transparent insulation layer, formed on the light emission side of the display panel where the touch electrode has been formed. An absolute value of a difference between a refractive index of the organic transparent insulation layer and a refractive index of the touch electrode is less than or equal to a predetermined value.

For example, the predetermined value is 0.2.

For example, the organic transparent insulation layer includes a pattern of the organic transparent insulation layer complementary to the touch electrode.

For example, the organic transparent insulation layer is formed by an organic transparent insulation material having a photosensitivity, and the photosensitivity of the organic transparent insulation material is contrary to a photosensitivity of a photoresist which is used in forming the touch electrode.

For example, the organic transparent insulation material is any one of a phenol aldehyde resin material, an acrylic material and a polyamide material.

For example, the touch electrode and the pattern of the organic transparent insulation layer have a same thickness.

For example, the touch electrode and the pattern of the organic transparent insulation layer have a thickness in a range of 50 nm to 200 nm.

For example, the touch electrode includes: a plurality of touch driving electrodes and a plurality of touch sensing electrodes insulated from each other and arranged in a same layer; and the touch driving electrodes and the touch sensing electrodes are parallel to each other and alternately arranged.

According to an embodiment of the present disclosure, there is provided a display device. The display device comprises the touch screen as described above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments of the present disclosure will be described in a clearly and fully understandable way in connection with the drawings. It is obvious that the described embodiments are just a part but not all of the embodiments of the present disclosure. Based on the described embodiments of the present disclosure, those ordinarily skilled in the art can obtain other embodiment(s), without any inventive work, which should be within the protective scope of the present disclosure.

The shapes and the thicknesses of respective film layers shown in the accompanying drawings are merely illustrative of embodiments of the present disclosure, but are not intended to reflect real scales.

Figure 1:
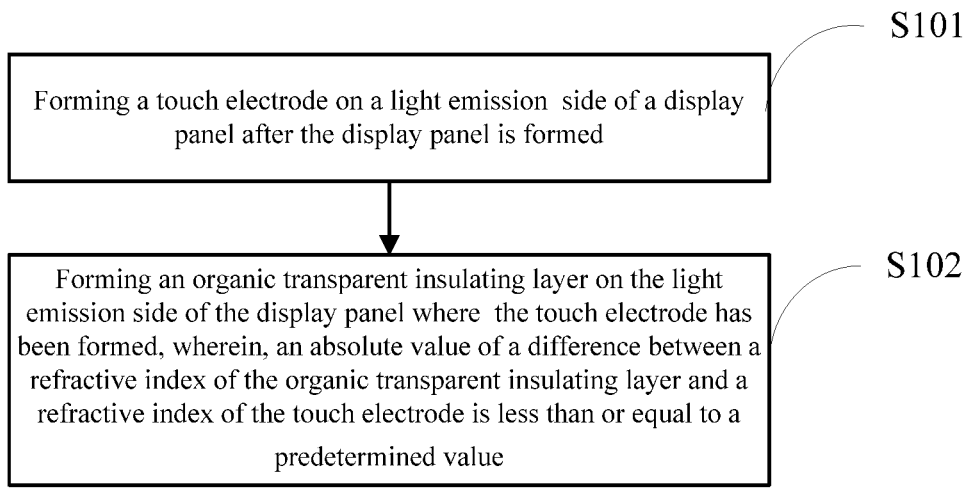
FIG. 1 and FIG. 2 are flowcharts illustrating a fabrication method of a touch screen according to embodiments of the present disclosure.

Embodiments of the present disclosure provide a fabrication method of a touch screen. As shown in FIG. 1, the method for example comprises steps of:

S101: forming a touch electrode on a light emission side of a display panel after the display panel is formed;

For example, a transparent conductive oxide material such as Indium Tin Oxides (ITO) is used to form the touch electrode by a patterning process. For example, firstly, a ITO thin film is deposited on the light emission side of the display panel after the display panel is formed; then, a photoresist layer is coated on the ITO thin film; next, the photoresist is exposed and developed; thereafter, the ITO thin film which is not covered with the photoresist is etched; and finally, the remaining photoresist is removed, to obtain the touch electrode.

For example, the display panel is a liquid crystal display panel which comprises an array substrate and an opposed substrate, and the light emission side of the display panel is a side of the opposed substrate away from the array substrate. For example, the display panel is an organic electroluminescent display panel of top-emission type which comprises an array substrate and a package cover plate, and the light emission side of the display panel is a side of the package cover plate away from the array substrate. For example, the display panel is the organic electroluminescent display panel of bottom-emission type which comprises the array substrate and the package cover plate, and the light emission side of the display panel is a side of the array substrate away from the package cover plate. The display panel may be any other devices with display function, which are not limited here.

S102: forming an organic transparent insulation layer on the light emission side of the display panel where the touch electrode has been formed. For example, the organic transparent insulation layer is formed by using a coating process. For example, an absolute value of a difference between a refractive index of the organic transparent insulation layer and a refractive index of the touch electrode is less than or equal to a predetermined value; that is, the refractive index of the organic transparent insulation layer is close to the refractive index of the touch electrode. For example, the touch electrode is made of ITO, and the refractive index of the touch electrode is about 1.92.

In the method according to the embodiments of the present disclosure, since the refractive index of the organic transparent insulation layer is close to the refractive index of the touch electrode, there is a relatively small optical path difference between the reflected light of the external natural light in a region having the touch electrode and the reflected light of the external natural light in a region not having the touch electrode, and there is a relatively small difference between the transmittance of the light inside the touch screen in the region having the touch electrode and the transmittance of the light inside the touch screen in the region not having the touch electrode; in this way, the problem of poor shadow elimination and the problem of white stripes in the touch screen can be decreased without using a shadow elimination glass. In addition, because the organic transparent insulation layer is formed by the coating process, the problem that the touch screen is damaged by high-temperature can be avoided. In addition, the organic transparent insulation layer is formed after the touch electrode has been formed, so that a formation apparatus for the touch electrode can be prevented from being polluted by the organic transparent insulation layer.

It should be noted that, in the method according to the embodiments of the present disclosure, in order to ensure the effects of decreasing the problem of poor shadow elimination and the problem of white stripes in the touch screen, the organic transparent insulation layer for example is set to have a thickness same as that of the touch electrode.

For example, in the method according to the embodiments of the present disclosure, in order to ensure the effect of decreasing the problem of poor shadow elimination and the problem of white stripes in the touch screen, the predetermined value for example is set to 0.2, that is, the absolute value of the difference between the refractive index of the organic transparent insulation layer and the refractive index of the touch electrode is less than or equal to 0.2. For example, in the case that the touch electrode is made of ITO and the refractive index of ITO is about 1.92, the refractive index of the organic transparent insulation layer is controlled in a range of 1.72 to 2.12, which is not limited here.

Of course, the absolute value of the difference between the refractive index of the organic transparent insulation layer and the refractive index of the touch electrode is not limited to be less than or equal to 0.2. For example, the absolute value of the difference between the refractive index of the organic transparent insulation layer and the refractive index of the touch electrode is greater than 0.2; however, in this case, the effects of decreasing the problem of poor shadow elimination and the problem of white stripes in the touch screen is limited.

Figure 2:
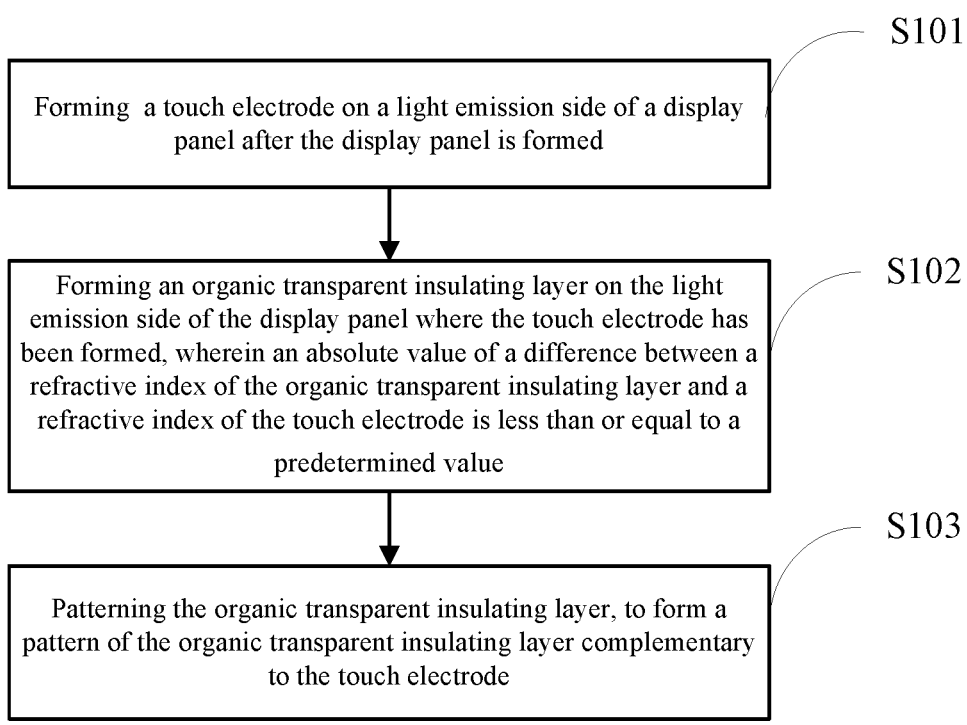

For example, after the organic transparent insulation layer is formed by performing step S102 in the method according to the embodiments of the present disclosure, as shown in FIG. 2, the method further comprises steps of:

S103: patterning the organic transparent insulation layer, to form a pattern of the organic transparent insulation layer complementary to the touch electrode. For example, the organic transparent insulation layer is patterned with a single-tone mask, which is not described in detail here. The organic transparent insulation layer is patterned to form the pattern of the organic transparent insulation layer complementary to the touch electrode, that is, the pattern of the organic transparent insulation layer is not arranged in a region having the touch electrode and the pattern of the organic transparent insulation layer is arranged in a region not having the touch electrode. In this way, the optical path difference between the reflected light of the external natural light in the region having the touch electrode and the reflected light of the external natural light in the region not having the pattern of the touch electrode (i.e., the region having the pattern of the organic transparent insulation layer) is further reduced, and the difference between the transmittance of the light inside the touch screen in the region having the touch electrode and the transmittance of the light inside the touch screen in the region not having the touch electrode (i.e., the region having the pattern of the organic transparent insulation layer) is further reduced; and therefore, the problem of poor shadow elimination and the problem of white stripes in the touch screen is further decreased.

For example, in the step S102 of the method according to the embodiments of the present disclosure, the organic transparent insulation layer is formed as follows: coating an organic transparent insulation material having a photosensitivity to form the organic transparent insulation layer. For example, the photosensitivity of the organic transparent insulation material is contrary to that of a photoresist which is used in forming the touch electrode; and thus, in step S103 of the method according to the embodiments of the present disclosure, the pattering of the organic transparent insulation layer is implemented as follows: firstly, exposing the organic transparent insulation layer with a mask same as the mask used in patterning the touch electrode; secondly, developing the exposed organic transparent insulation layer to form the pattern of the organic transparent insulation layer. Since the organic transparent insulation material has the photosensitivity, the organic transparent insulation layer is only needed to be exposed and developed in the process of patterning the organic transparent insulation layer, which saves steps of coating a photoresist, etching and removing the photoresist in the process of patterning the organic transparent insulation layer, so that the patterning process of the organic transparent insulation layer is relatively simple. In addition, since the photosensitivity of the photoresist which is used in the process of patterning the touch electrode is contrary to the photosensitivity of the organic transparent insulation layer, the same mask is used to form the touch electrode and the pattern of the organic transparent insulation layer, which have complementary patterns, so that fabrication cost of the touch screen is reduced.

For example, in the method according to the embodiments of the present disclosure, in the case that the organic transparent insulation layer is formed by coating the organic transparent insulation material, the organic transparent insulation layer is formed by coating any one of a phenol aldehyde resin material, an acrylic material and a polyamide material. The refractive index of the phenol aldehyde resin material, the acrylic material or the polyamide material is adjusted by increasing the number of benzene rings or by replacing atoms of the benzene rings by halogen atoms (excluding fluorine), so that the absolute value of the difference between the refractive index of the phenol aldehyde resin material, the acrylic material or the polyamide material and the refractive index of the touch electrode is less than or equal to the predetermined value. The refractive index of the phenol aldehyde resin material, the acrylic material or the polyamide material is generally less than 1.8; in the case that the touch electrode is made of ITO, in order to ensure the effects of decreasing the problem of poor shadow elimination and the problem of white stripes in the touch screen, the refractive indexes of the above materials for example are increased by increasing the number of benzene rings in the above materials through an organic synthesis method, so that the refractive indexes of the above materials after performing the organic synthesis are increased to the range of 1.8 to 1.9; or, the refractive indexes of the above materials are increased by replacing atoms of the benzene rings in the above materials by halogen atoms (excluding fluorine), so that the refractive indexes of the above materials are increased to the range of 1.8 to 1.9, which is not limited here.

For example, in the method according to the embodiments of the present disclosure, during forming the pattern of the organic transparent insulation layer, the pattern of the organic transparent insulation layer is formed to have a thickness same as that of the touch electrode. In this way, the optical path difference between the reflected light of the external natural light in the region having the touch electrode and the reflected light of the external natural light in the region not having the touch electrode (i.e., the region having the pattern of the organic transparent insulation layer) is further reduced, and thus the difference between the transmittance of the light inside the touch screen in the region having the touch electrode and the transmittance of the light inside the touch screen in the region not having the touch electrode (i.e., the region having the pattern of the organic transparent insulation layer) is further reduced, and therefore, the problem of poor shadow elimination and the problem of white stripes in the touch screen are further decreased. For example, a thickness of the touch electrode is within a range of 50 nm to 200 nm, and the pattern of the organic transparent insulation layer has a thickness same as that of the touch electrode, that is, the pattern of the organic transparent insulation layer also has a thickness in the range of 50 nm to 200 nm.

Figure 3:
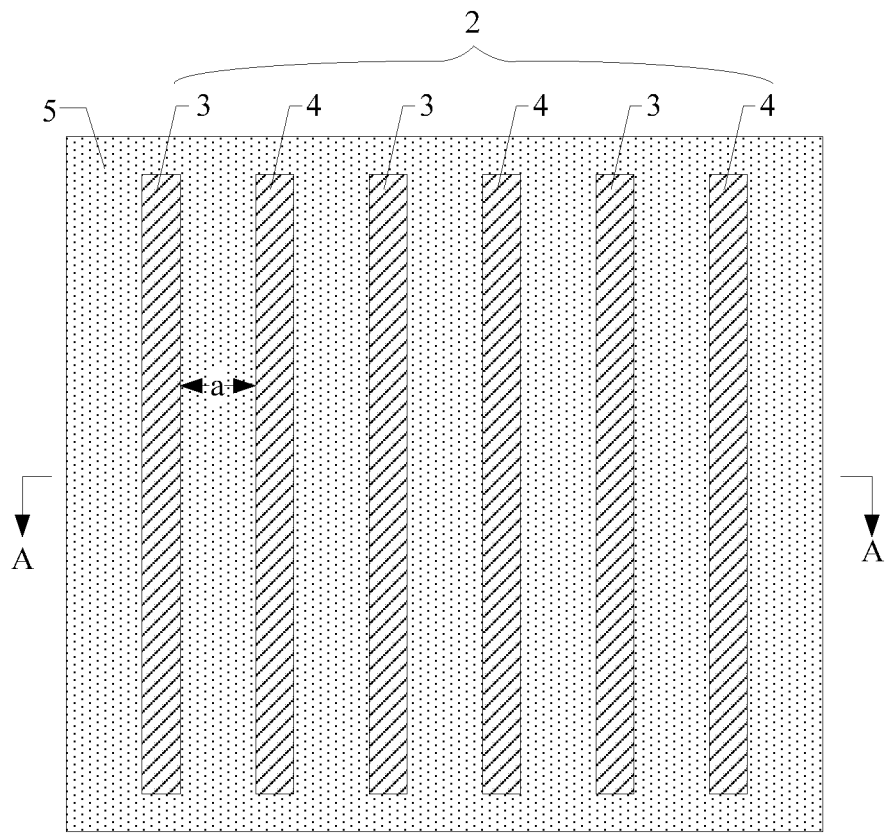
FIG. 3 is a structural schematic view illustrating a touch screen according to embodiments of the present disclosure.
Figure 4:
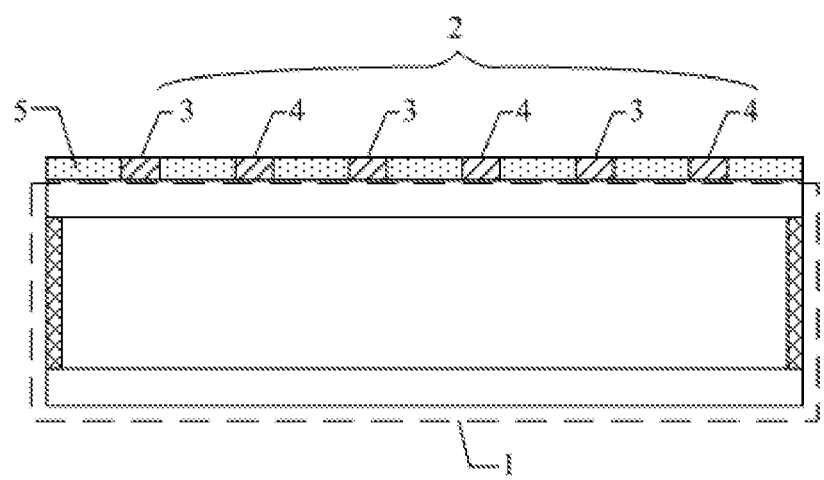
FIG. 4 is a cross-sectional view along an A-A direction of FIG. 3.

For example, in step S101 of the method according to the embodiments of the present disclosure, during forming the touch electrode, a plurality of touch driving electrodes and a plurality of touch sensing electrodes insulated from each other and arranged in a same layer are formed. For example, the touch driving electrodes and the touch sensing electrodes are parallel to each other and alternately arranged. For example, FIG. 4 is a cross-sectional view taken along an AA direction of FIG. 3, as shown in FIGS. 3 and 4, the touch electrode 2 is formed on the light emission side of the display panel 1, the touch electrode 2 includes a plurality of touch driving electrodes 3 and a plurality of touch sensing electrodes 4 insulated from each other and arranged in a same layer, the touch driving electrodes 3 and the touch sensing electrodes 4 are parallel to each other and alternately arranged, and mutual capacitances are formed between the touch driving electrodes 3 and the touch sensing electrodes 4; the pattern of the organic transparent insulation layer 5 is complementary to the touch electrode 2, that is, the pattern of the organic transparent insulation layer 5 is provided in the region not having the touch driving electrodes 3 and the touch sensing electrodes 4. In this way, the optical path difference between the reflected light of the external natural light in the region where the touch driving electrodes 3 and the touch sensing electrodes 4 are provided and the reflected light of the external light in the region where the touch driving electrodes 3 and the touch sensing electrodes 4 are not provided (i.e., the region where the pattern of the organic transparent insulation layer 5 is provided) is reduced, and the difference between the transmittance of the light inside the touch screen in the region where the touch driving electrodes 3 and the touch sensing electrodes 4 are provided and the transmittance of the light inside the touch screen in the region where the touch driving electrodes 3 and the touch sensing electrodes 4 are not provided (i.e., the region where the pattern of the organic transparent insulation layer 5 is provided) is reduced, and therefore, the problem of poor shadow elimination and the problem of white stripes in the touch screen are significantly decreased.

For example, in the method according to the embodiments of the present disclosure, a plurality of touch driving electrodes and a plurality of touch sensing electrodes insulated from each other and arranged in the same layer are formed, and the touch driving electrodes and the touch sensing electrodes are parallel to each other and alternately arranged, as shown in FIG. 3, a distance a between the touch driving electrode 3 and the touch sensing electrode 4 is set to be in a range of 8 µm to 15 µm.

For example, in step S101 of the method according to the embodiments of the present disclosure, during forming the touch electrode, the pattern of the touch electrode is not limited to that shown in FIG. 3. For example, the touch electrode is formed so that the touch driving electrodes and the touch sensing electrodes are insulated from each other and arranged in a same layer and cross with each other. For example, each of the touch sensing electrodes continuously extends along a first direction, and each of the touch driving electrodes includes a plurality of touch driving sub-electrodes insulated from each other and extending along a second direction, and the touch driving sub-electrodes are electrically connected with each other through a metal bridge; or, each of the touch sensing electrodes includes a plurality of touch sensing sub-electrodes insulated from each other and extending along a first direction and the touch sensing sub-electrodes are electrically connected with each other through a metal bridge, and each of the touch driving electrodes continuously extends along a second direction. For example, the first and second directions are perpendicular to each other. The pattern of the touch electrode is not limited in the embodiments of the disclosure.

For example, in step S101 of the method according to the embodiments of the present disclosure, during forming the touch electrode, the touch driving electrodes and the touch sensing electrodes are not limited to be formed in a same layer. For example, the touch driving electrodes and the touch sensing electrodes are arranged in different layers, and mutual capacitances are formed at intersections between the touch driving electrodes and the touch sensing electrodes. In the case that the touch driving electrodes and the touch sensing electrodes are provided in different layers, an insulation layer is arranged between the layer where the touch driving electrodes are provided and the layer where the touch sensing electrodes are provided, the insulation layer plays a role of decreasing the problem of poor shadow elimination and the problem of white stripes in the touch screen; and therefore, the problem of poor shadow elimination and the problem of white stripes in the touch screen where the touch driving electrodes and the touch sensing electrodes are provided in different layers are not apparent, so that the fabrication method of the touch screen according to the embodiments of the present disclosure is particularly suitable to the touch screen where the touch driving electrodes and the touch sensing electrodes are provided in the same layer.

Embodiments of the present disclosure further provide a touch screen, and the touch screen is fabricated by the method according to the embodiments of the present disclosure. The structure of the touch screen may refer to the embodiments of the fabrication method of the touch screen described above, and details thereof will not be repeated here.

Embodiments of the present disclosure further provide a display device, and the display device comprises the above-described touch screen according to the embodiments of the present disclosure. The display device may be: a mobile phone, a tablet personal computer, a television, a monitor, a laptop computer, a digital photo frame, a navigator, or any other product or component having a display function. The embodiments of the display device may refer to the touch screen described above, and details thereof will not be repeated here.

The embodiments of the present disclosure provide the touch screen, the fabrication method thereof and the display device. In the process of fabricating the touch screen, after forming the touch electrode on the light emission side of the display panel which is formed previously, the organic transparent insulation layer having the reflective index similar to or same as that of the touch electrode is formed on the light emission side of the display panel where the touch electrode has been formed by using a coating process. Since the refractive index of the organic transparent insulation layer is similar to or same as the refractive index of the touch electrode, there is a relatively small optical path difference between the reflected light of the external natural light in the region having the touch electrode and the reflected light of the external natural light in the region not having the touch electrode, and there is a relatively small difference between the transmittance of the light inside the touch screen in the region having the touch electrode and the transmittance of the light inside the touch screen in the region not having the touch electrode, and in this way, the problem of poor shadow elimination and the problem of white stripes in the touch screen are decreased without using a shadow elimination glass. In addition, because the organic transparent insulation layer is formed by the coating process, the problem that the touch screen is damaged by high-temperature is avoided. In addition, the organic transparent insulation layer is formed after the touch electrode has been formed, so that the formation apparatus for the touch electrode is prevented from being polluted by the organic transparent insulation layer.

The foregoing embodiments merely are exemplary embodiments of the present disclosure, and not intended to define the scope of the present disclosure, and the scope of the present disclosure is determined by the appended claims.

The present application claims priority of Chinese Patent Application No. 201510149363.6 filed on Mar. 31, 2015, the disclosure of which is incorporated herein by reference in its entirety as part of the present application.

The invention claimed is:

1. A fabrication method of a touch screen, comprising:
   forming a touch electrode on a light emission side of a display panel, after the display panel is formed; and
   forming an organic transparent insulation layer on the light emission side of the display panel, where the touch electrode has been formed,
   wherein an absolute value of a difference between a refractive index of the organic transparent insulation layer and a refractive index of the touch electrode is less than or equal to a predetermined value; and
   after forming the organic transparent insulation layer, patterning the organic transparent insulation layer, to form a pattern of the organic transparent insulation layer complementary to the touch electrode.

2. The method according to claim 1, wherein the predetermined value is 0.2.

3. The method according to claim 1, wherein the forming the touch electrode includes:
   forming a plurality of touch driving electrodes and a plurality of touch sensing electrodes insulated from each other and arranged in a same layer,
   wherein the touch driving electrodes and the touch sensing electrodes are parallel to each other and alternately arranged.

4. The method according to claim 1, wherein the organic transparent insulation layer is formed by using a coating process.

5. The method according to claim 1, wherein
   the forming the organic transparent insulation layer includes:
      forming an organic transparent insulation material having a photosensitivity to form the organic transparent insulation layer, wherein the photosensitivity of the organic transparent insulation material is contrary to a photosensitivity of a photoresist which is used in forming the touch electrode; and
   the patterning the organic transparent insulation layer includes:
      exposing the organic transparent insulation layer with a same mask which is used in forming the touch electrode; and
      developing the exposed organic transparent insulation layer.

6. The method according to claim 5, wherein the forming the organic transparent insulation material includes:
   forming any one of a phenol aldehyde resin material, an acrylic material and a polyamide material.

7. The method according to claim 1, wherein the patterning the organic transparent insulation layer, to form the pattern of the organic transparent insulation layer includes:
   forming the pattern of the organic transparent insulation layer having a same thickness as that of the touch electrode.

8. The method according to claim 7, wherein the touch electrode and the pattern of the organic transparent insulation layer have a thickness in a range of 50 nm to 200 nm.

9. A touch screen, comprising:
   a formed display panel;
   a touch electrode, formed on a light emission side of the display panel; and
   an organic transparent insulation layer, formed on the light emission side of the display panel where the touch electrode has been formed,
   wherein an absolute value of a difference between a refractive index of the organic transparent insulation layer and a refractive index of the touch electrode is less than or equal to a predetermined value; and
   the organic transparent insulation layer includes a pattern of the organic transparent insulation layer complementary to the touch electrode.

10. The touch screen according to claim 9, wherein the predetermined value is 0.2.

11. The touch screen according to claim 9, wherein the touch electrode includes: a plurality of touch driving electrodes and a plurality of touch sensing electrodes insulated from each other and arranged in a same layer, and wherein the touch driving electrodes and the touch sensing electrodes are parallel to each other and alternately arranged.

12. The touch screen according to claim 9, wherein the organic transparent insulation layer is formed by an organic transparent insulation material having a photosensitivity, and the photosensitivity of the organic transparent insulation material is contrary to a photosensitivity of a photoresist which is used in forming the touch electrode.

13. The touch screen according to claim 12, wherein the organic transparent insulation material is any one of a phenol aldehyde resin material, an acrylic material and a polyamide material.

14. The touch screen according to claim 9, wherein the touch electrode and the pattern of the organic transparent insulation layer have a same thickness.

15. The touch screen according to claim 14, wherein the touch electrode and the pattern of the organic transparent insulation layer have a thickness in a range of 50 nm to 200 nm.

16. A display device, comprising the touch screen according to claim 9.

* * * * *